Oct. 25, 1932.   M. L. KING   1,884,736
AUTOMOBILE TRUNK
Filed Aug. 8, 1930   3 Sheets-Sheet 1
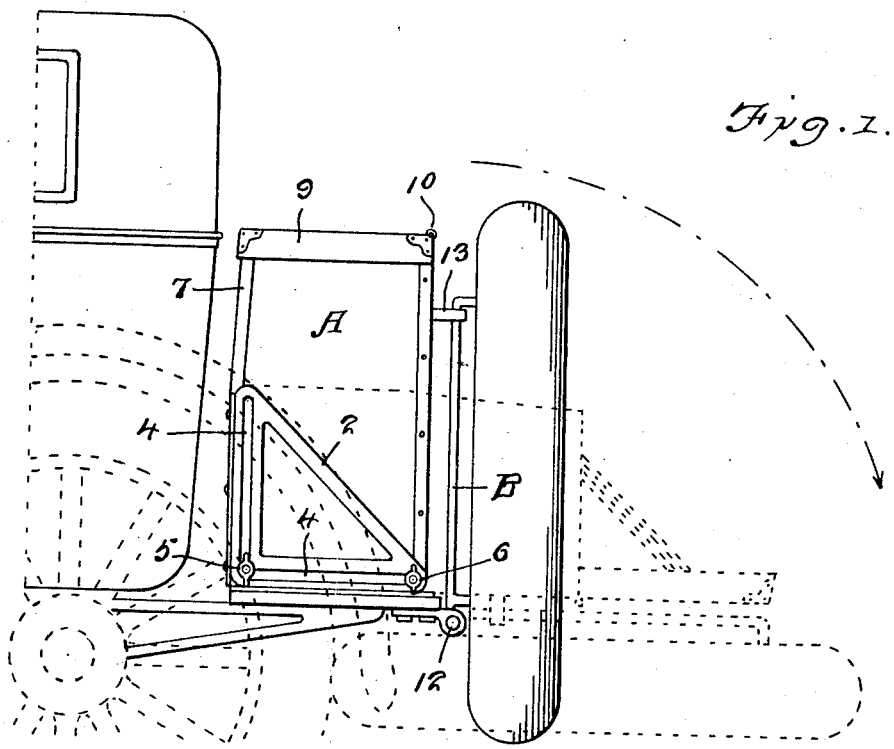
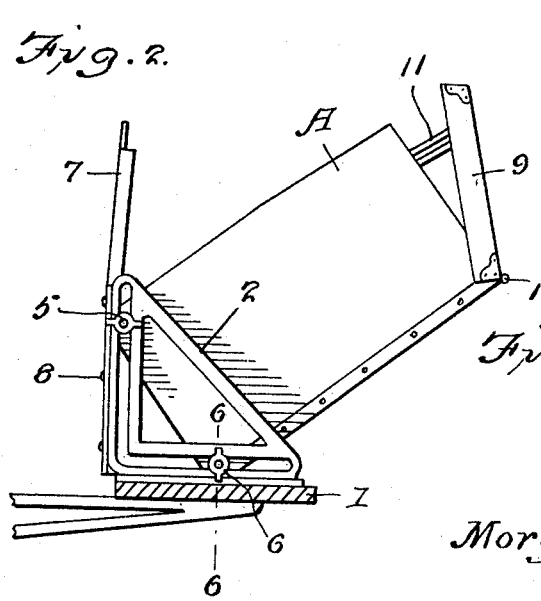
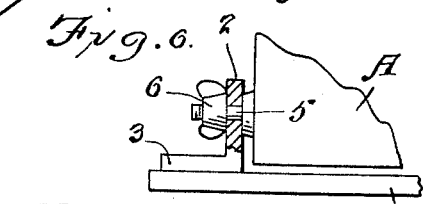
Morgan L. King, INVENTOR
BY Victor J. Evans, ATTORNEY Oct. 25, 1932.     M. L. KING     1,884,736
AUTOMOBILE TRUNK
Filed Aug. 8, 1930     3 Sheets-Sheet 2
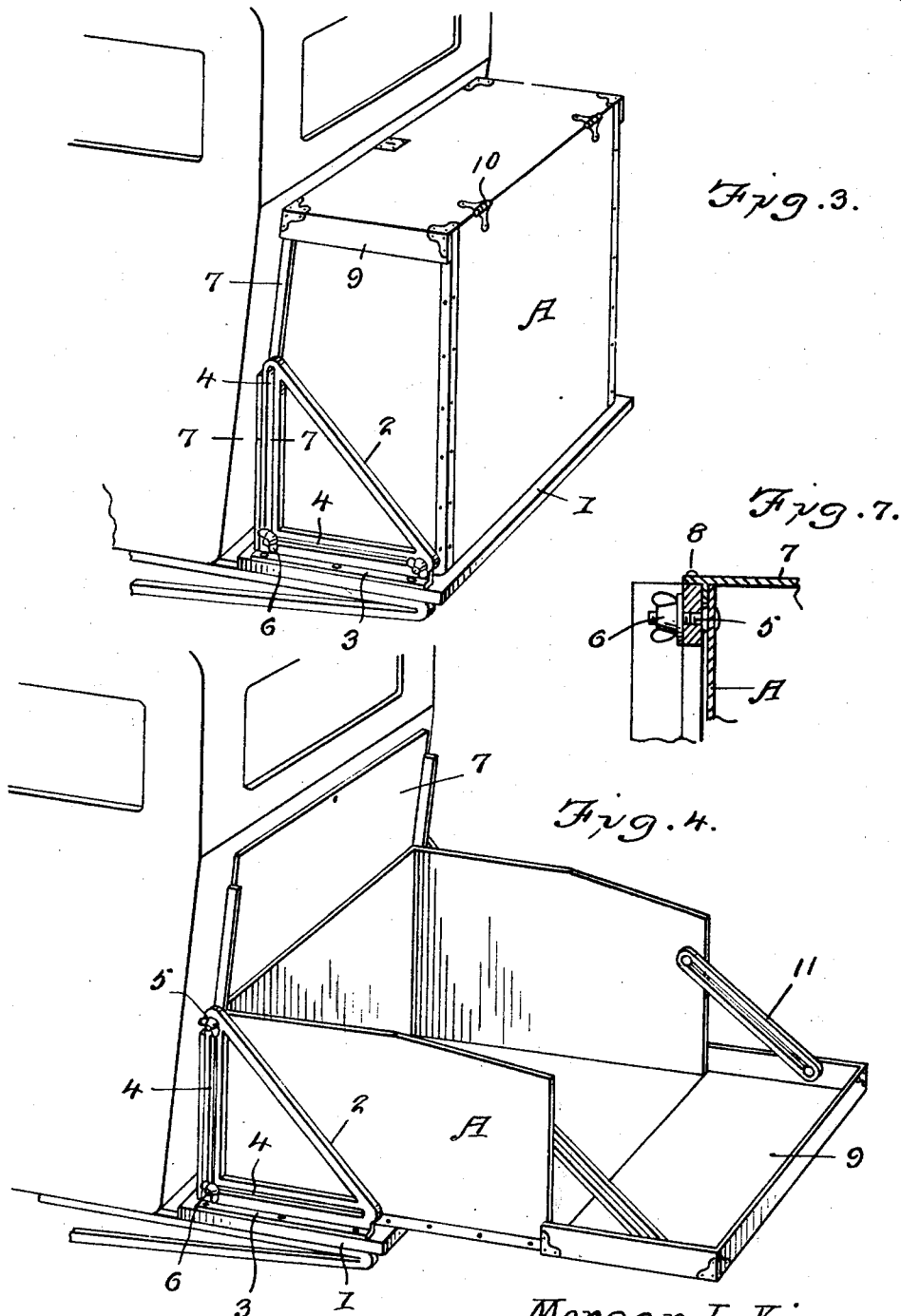
Morgan L. King
INVENTOR
BY Victor J. Evans
ATTORNEY

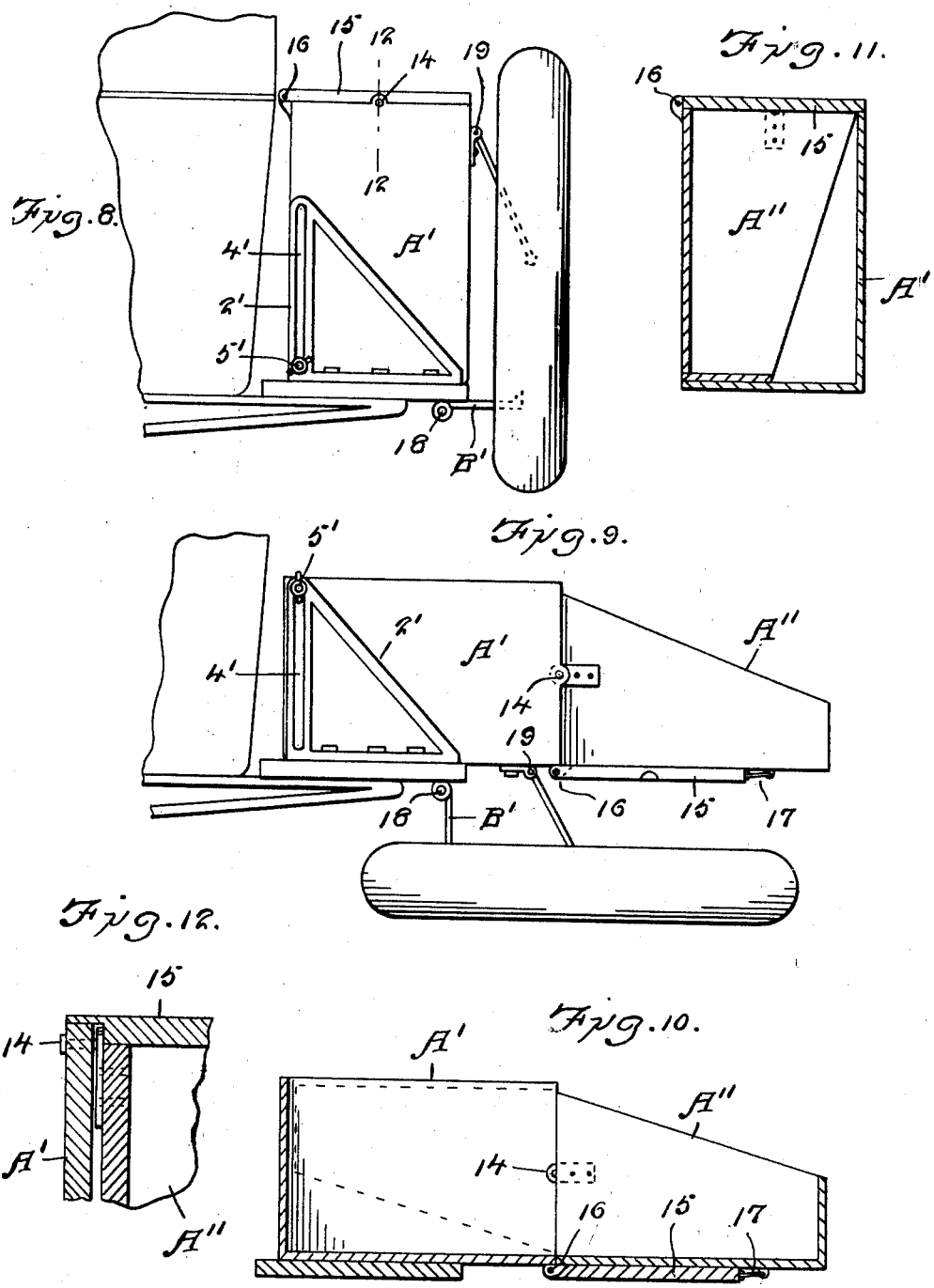

Patented Oct. 25, 1932

1,884,736

UNITED STATES PATENT OFFICE

MORGAN L. KING, OF CARTHAGE, MISSOURI, ASSIGNOR TO THE MID-WEST STEEL PRODUCTS CORPORATION, OF CARTHAGE, MISSOURI

AUTOMOBILE TRUNK

Application filed August 8, 1930. Serial No. 473,944.

This invention relates to a trunk for motor vehicles and the like, the general object of the invention being to provide means whereby the trunk can be supported in vertical or upright position at the rear or side of a vehicle so that it can be used in the regular way and gives the appearance of an ordinary trunk or the trunk can be supported in a horizontal position and extended to provide a container which will carry packages or articles of greater size than could be carried by a regular trunk.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a side view of the rear part of a motor vehicle, showing the invention in use, with the trunk in vertical position.

Figure 2 is a detail view showing how the trunk can be turned from a vertical position to a horizontal position or vice versa.

Figure 3 is a perspective view of the rear part of a vehicle, with the trunk supported in vertical position and the spare tire carrier removed.

Figure 4 is a view similar to Figure 3, but showing the trunk in horizontal position and opened up.

Figure 5 is a view of one of the upright brackets for adjustably supporting the trunk.

Figure 6 is a section on line 6—6 of Figure 2.

Figure 7 is a section on line 7—7 of Figure 3.

Figure 8 is a view similar to Figure 1, but showing a modification.

Figure 9 is a similar view but showing the trunk in horizontal position and the extension in open position.

Figure 10 is a vertical sectional view through the trunk and its extension when the same is in the position shown in Figure 9.

Figure 11 is a vertical sectional view through the trunk when in vertical position.

Figure 12 is a section on line 12—12 of Figure 8.

In these drawings, the numeral 1 indicates a base which is shown in the drawings as supported in horizontal position at the rear of a motor vehicle, but which may be placed on the running board or other part of a vehicle. An upright bracket 2 is fastened to each end of the base by its horizontal flange 3 which is bolted or otherwise fastened to the base. Each bracket is of substantially triangular shape and has the communicating vertical and horizontal slots 4 therein so that the slots form a continuous guideway for the bolts 5 carried by the trunk A and having the wing nuts 6 on their outer ends. The bolts are so spaced apart that the trunk can be tilted from a vertical position, as shown in Figure 1, to a horizontal position, as shown in Figure 4, and vice versa, it simply being necessary to loosen the wing nuts to permit the trunk to be adjusted and then by tightening the nuts, the trunk is held in adjusted position. As shown in Figure 2, the bolts slide in the slots 4 during the adjusting movements of the trunk. The top and the forward side of the trunk are open, as shown in Figure 4, the forward side of the trunk being closed when the same is in vertical position by a plate-like member 7 which is fastened to the brackets 2, as shown at 8, said member extending far enough above the brackets as to close the upper part of the forward side of the trunk when the same is in vertical position. The top of the trunk is covered by a flanged lid 9 hinged to the upper edge of the rear side of the trunk, as shown at 10, and the slotted links 11 connected with the lid and trunk act to hold the lid in a horizontal position when the same is open and the trunk is in horizontal position, as shown in Figure 4.

From the foregoing it will be seen that when in vertical position, the trunk has the appearance of an ordinary trunk and articles can be placed in the same and removed therefrom by swinging the lid 9 to open position. By swinging the trunk to horizontal position and opening the lid, as shown in Figure 4, the capacity of the trunk is increased so that larger articles can be carried in the trunk than could be when the trunk is in vertical position.

A spare tire carrier B is hingedly connected with the rear edge of the base 1, as shown at 12, and the upper part of the carrier is slidably supported from the rear of the trunk by the projections 13 having holes therein through which the carrier passes. Thus the spare tire is arranged at the rear of the trunk when the same is in vertical position and will move to a horizontal position when the trunk is moved to such position, as shown in dotted lines in Figure 1. Thus the tire and its carrier will not interfere with the movements of the trunk nor the opening of the trunk when the same is in either a vertical or a horizontal position.

In the modification shown in Figures 8 to 12, the brackets 2' are only provided with the vertical slots 4', each slot receiving a bolt 5' carried by the trunk. Thus the trunk A' can be moved from a vertical position to a horizontal position and vice versa, as before explained and as shown in Figures 8 and 9, but in the modified form, the trunk is formed with an inner member A'' which is pivoted at the center of one end to the top part of the trunk, as shown at 14, this member, when in closed position and the trunk in vertical position, forming the forward side of the trunk and when the trunk is in horizontal position and the member open, said member forms an extension of the trunk, as shown in Figures 9 and 10. A lid 15 is hinged to the member A'', as shown at 16, and when the member is in closed position, and the trunk in vertical position, said lid forms a cover for the top part of the trunk so that access to the interior of the trunk can be had by opening the lid. This lid, when the trunk is to be moved to a horizontal position, is folded over upon the exterior side of the member A'' and comes under the member when the parts are in a horizontal position. A latch 17 is provided for connecting the free end of the lid 15 to the member to hold it against the said member, as shown in Figures 9 and 10.

In this construction, the spare tire carrier B' has one part hinged to the bottom of the base, as shown at 18, and another part hinged to the trunk, as shown at 19, so that the carrier and the spare tire follow the movement of the trunk, as shown in Figures 8 and 9.

Thus I have provided a vehicle trunk which can be supported from the vehicle in either a vertical or horizontal position, with means for permitting access to the trunk when the same is in either a horizontal or vertical position and means whereby the capacity of the trunk is greatly increased when the same is in horizontal position.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. In combination with a vehicle, a horizontal base attached to a part of the vehicle, brackets connected with the base and each having a vertically arranged slot therein, a trunk located between the brackets, bolts in the trunk passing through the slots in the brackets, nuts on the bolts engaging the brackets when tightened to hold the trunk in adjusted position, said trunk having its forward side and its top open, a lid for closing the top and a member for closing the side when the trunk is in vertical position.

2. In combination with a vehicle, slotted brackets carried by the vehicle, a trunk, bolts carried thereby and passing through the slots, the slots being arranged to permit the trunk to be moved to either a vertical or a horizontal position, a hinged lid for closing the top of the trunk when the same is in vertical position, the forward side of the trunk being open, means for closing the said side when the trunk is in vertical position and said lid, when in open position and the trunk is in horizontal position, forming an extension of the trunk.

3. In combination with a vehicle, slotted brackets carried by the vehicle, a trunk, bolts carried thereby and passing through the slots, the slots being arranged to permit the trunk to be moved to either a vertical or a horizontal position, a hinged lid for closing the top of the trunk when the same is in vertical position, the forward side of the trunk being open, means for closing the said side when the trunk is in vertical position, said side closing member consisting of a back, a pair of side members and a bottom part, the central portions of the side of the member being pivoted to the top of the trunk whereby the member can be swung outwardly when the trunk is in horizontal position to form an extension of the trunk.

4. In combination with a vehicle, a horizontal base attached to a part of the vehicle, brackets connected with the base and each having a vertically arranged slot therein, a trunk located between the brackets, bolts in the trunk passing through the slots in the brackets, nuts on the bolts engaging the brackets when tightened to hold the trunk in adjusted position, said trunk having its forward side and its top open, a lid for closing the top, a member for closing the side when the trunk is in vertical position and a spare tire carrier movably connected with the base and a part of the trunk whereby the tire and carrier will follow the movements of the trunk.

5. In combination with a vehicle, a horizontal base attached to a part of the vehicle, brackets connected with the base and each having slots, a trunk located between the brackets, bolts in the trunk and passing through the slots in the brackets, nuts on the bolts and engaging the brackets when tightened to hold the trunk in adjusted position, said trunk having its forward side and its top open, a member for closing the open side when the trunk is in the vertical position, means for holding said member stationary and in confronting relation to the open front of said trunk for abutting engagement of the latter with said member when vertically disposed.

6. In combination with a vehicle, a horizontal base attached thereto, a normally vertical trunk or carrier, adjustable means supported by the base for attaching the trunk or carrier to the same whereby the trunk or carrier may be moved from vertical to horizontal position close to the vehicle and remaining approximately the same relative distance from the vehicle when in either the vertical or horizontal position, means for securely fastening the trunk or carrier to said means when in either position, the trunk or carrier including a body open at its top and one side, and a separate section closing the open side, and top of the trunk or carrier and forming an extension for the body when the latter is in horizontal position to be disposed outwardly thereof whereby the capacity of the body will be substantially double.

7. In combination with a vehicle, a horizontal base attached thereto, a normally vertical trunk or carrier, adjustable means supported by the base for attaching the trunk or carrier to the same whereby the trunk or carrier may be moved from vertical to horizontal position close to the vehicle and remaining approximately the same relative distance from the vehicle when in either the vertical or horizontal position, means for securely fastening the trunk or carrier to said means when in either position, the trunk or carrier including a body open at its top and forward side, a separate section for closing the open forward side, fitting within and hinged thereto with rivet hinges at its top central sides so that when the trunk is in horizontal position this separate section may be swung outwardly whereby the capacity of the body will be substantially double.

In testimony whereof I affix my signature.

MORGAN L. KING.